J. F. FALES.
Machine for Sewing Carpet Lining.
No. 3,247. Reissued Dec. 29, 1868.
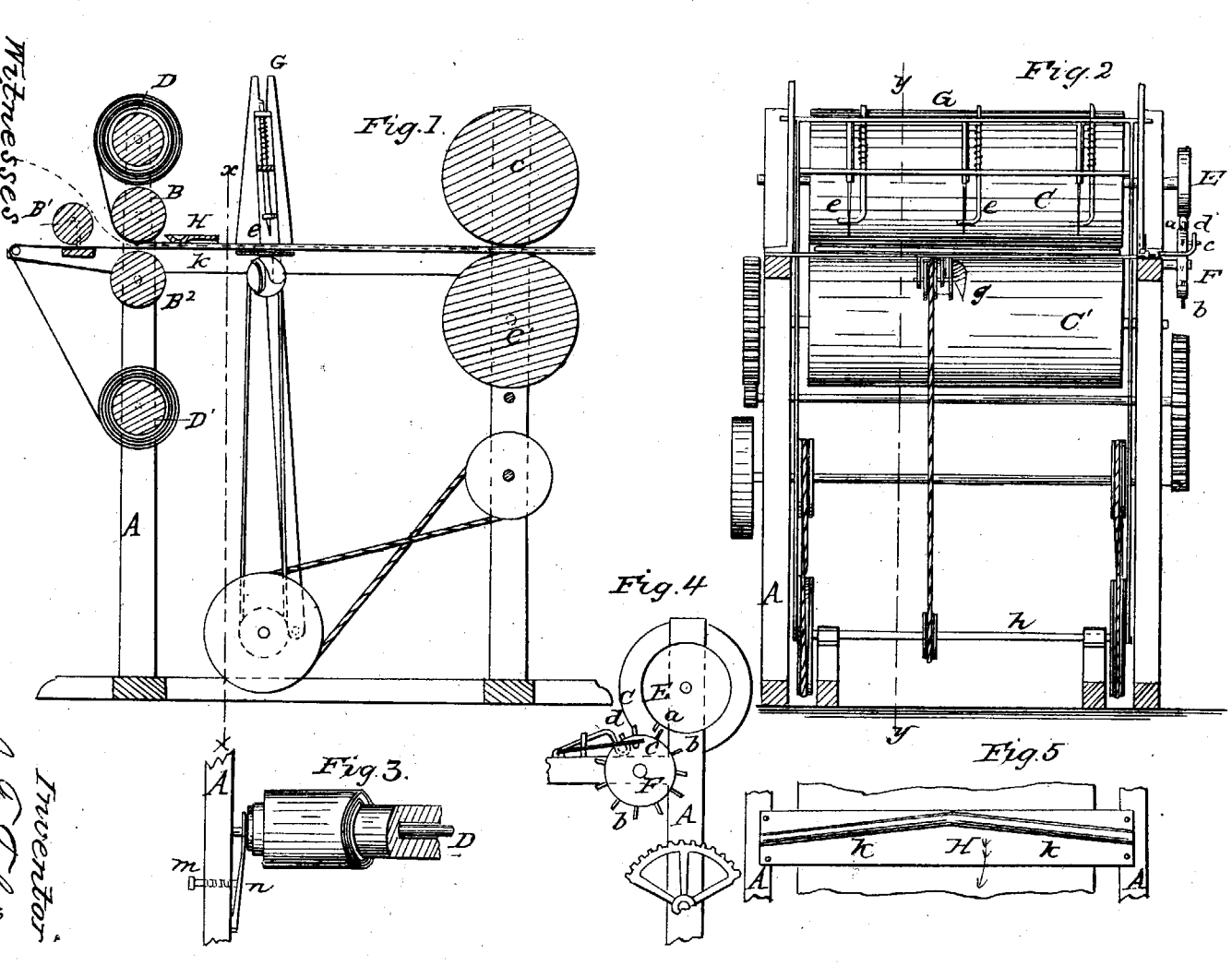
Witnesses
Thos Tusche
W Sumrn
Inventor
J. F. Fales
Per Munn & Co
Attorneys
N. PETERS, Photo-Lithographer, Washington, D. C.

UNITED STATES PATENT OFFICE.

JOEL F. FALES, OF WALPOLE, MASSACHUSETTS.

IMPROVEMENT IN MACHINES FOR SEWING CARPET-LININGS.

Specification forming part of Letters Patent No. 74,328, dated February 11, 1868; Reissue No. 3,247, dated December 29, 1868.

*To all whom it may concern:*

Be it known that I, JOEL F. FALES, of Walpole, in the county of Norfolk and State of Massachusetts, have invented new and useful Improvements in Machines for Manufacturing Carpet-Linings; and I do hereby declare that the following is a full, clear, and exact description thereof, which will enable those skilled in the art to make and use the same, reference being had to the accompanying drawings, forming part of this specification, in which—

Figure 1 represents a side sectional view of a machine for manufacturing carpet-lining, with my improvements attached, taken in the line *y y*, Fig. 2. Fig. 2 is a vertical cross-section taken in the line *x x*, Fig. 1. Figs. 3, 4, and 5 are details.

Similar letters of reference indicate corresponding parts.

This invention relates to improvements on a machine for manufacturing carpet-lining for which a patent was granted to John R. Harrington, dated April 1, 1856, which improvements consist in the application to such a machine of a sewing mechanism which is arranged between the guide and feed rolls, and so that the said sewing mechanism does not in the least interfere with the continuous motion of the fabric. For this purpose the mechanism for moving the swinging needle is so arranged that the needle when it enters the fabric will move forward with the fabric, and will move back again over the cloth when out, thus not interfering with the motion of the fabric.

The invention consists in attaching the sewing mechanism to a reciprocating swinging frame, and in providing it with a stationary slotted bed or cloth-plate, over which the fabric is continuously fed.

A is the frame, on which, as in the Harrington machine, are hung the small guide-rolls B B′ B², which receive the sheet-paper from the feed-rolls D D′, above and below, for the lining of the carpet, with the batting between them, as usual, and the large measuring-rolls C C′, all arranged and operating by gearing in the usual way. On one end of one of the measuring-rolls, C, is affixed a wheel, E, having a tooth or spur, *a*, on its periphery, which engages in the teeth *b b* on a wheel, F, and on the side of the wheel F is a spur, *c*, that catches a hammer, *d*, which strikes a bell, and thus gives the signal when the measuring-rolls have made a certain number of revolutions and passed between them a given number of yards of fabric, as shown in Fig. 4 in detail.

*h* is the driving-shaft for the sewing mechanism. It has its bearings in the frame A.

Upon the frame A is placed, in front of the guide-roll B, a frame, G, to support a series of needles for stitching or quilting the fabric as it moves forward to the measuring-rolls.

The frame G consists of two slotted uprights, *f f*, at the opposite sides of the frame A, and of a horizontal plate, *i*, connecting their lower ends. The plate *i* is under the fabric, and serves as a cloth-plate, it being slotted to allow the needles to pass through and move in it.

The needles *e e*, of which any suitable number may be used, (three being shown in Fig. 2,) project downward from a frame, H, which has projecting pins *j j* at its ends, that fit into vertical slots of the uprights *f*, as shown.

It must here be stated that the slots of the uprights *f* are vertically above the driving-shaft *h*.

The frame H has downwardly-extending arms *l*, which are with their lower ends pivoted to cranks or eccentrics that are formed at the ends of shaft *h*, as shown.

Each needle fits through the horizontal arm of a presser-foot, O, as shown in Fig. 2.

Each presser-foot is fitted through two horizontal bars of the frame H, and is, by means of a spring, *r*, which is under the upper one of the said horizontal bars, held down and made yielding to pressure from below.

The operation of the sewing mechanism is as follows: The fabric is drawn continuously ahead. At the same time the sewing-frame H receives combined oscillating and reciprocating motion by its connection with the shaft *h*, and the needles then pierce the fabric. They are then, by their connection with *h*, swung forward so as to move as fast as the fabric, and are pushed up and out when the cams *l* are in front of *h*. The presser-feet reach the fabric when the needle has just pierced the same, and remain then on the fabric, supported by the cloth-plate *i*, while the needles pass still farther down. The springs *r* allow this displacement of the presser-feet, and adjust them again when the needles have been raised out of the fabric.

Under the table *i* is arranged a horizontal shaft, *s*, on which a number of rotating loopers, *g*, are mounted, one to each needle. These loopers receive motion from the shaft *h*, or otherwise, and from the stitch, while the needle is under the cloth-plate.

In Fig. 2 but one looper is shown, although there should be one for each needle.

Between the frame G and guide-roll B is placed a flat metal smoothing-plate, H′, which has a double-incline rib, *k k*, running from the middle on the rear side to the ends of the plate, for the purpose of pressing out the wrinkles in the paper as it comes up to the sewing-needles, the wrinkles being carried to the edges successively.

An adjusting set-screw, *m*, is arranged to bear on each end of the feed-rolls D D′, hung on springs *n n*, for the purpose of keeping the paper from passing beyond the ends of the roll and producing friction.

Having thus described my invention, what I claim as new, and desire to secure by Letters Patent, is—

1. The combination, with the mechanism for moving the material forward continuously, of a reciprocating swinging frame, H, carrying the sewing mechanism, the needle entering and moving forward with the fabric, and moving back over the fabric when out, substantially as set forth.

2. The swinging frame H, carrying the sewing mechanism, when operating in connection with the bed-plate *i* and with a continuous feeding mechanism for the fabric, substantially as specified.

3. The yielding presser-feet O O, arranged in the swinging reciprocating frame H, and operating substantially as herein shown and described.

4. The combination of the guide-rolls B $B^2$, smoothing-plate H′, a sewing mechanism, and feed-rolls C C′, all arranged and operating substantially as set forth.

5. In combination with a carpet-lining machine constructed as described, the sewing devices, smoothing-plate H′, wheels E F, and hammer *d*, all arranged and operating as described, for the purpose specified.

JOEL F. FALES.

Witnesses:
IRA H. PARKIS,
BRADFORD LEWIS.